Patented Aug. 22, 1939

2,170,596

UNITED STATES PATENT OFFICE 2,170,596

OXYGEN-ABSORBING SOLUTION

Dorothy Quiggle, State College, Pa.

No Drawing. Application August 8, 1935,
Serial No. 35,397

18 Claims. (Cl. 23—232)

This invention relates to the production of stable oxygen-absorbing solutions.

The rapid, extensive, and repeated measurement of oxygen in gas analysis and the like has heretofore been a matter of great difficulty due in some cases to the necessity of preparing a fresh oxygen absorbing solution immediately prior to the measurement. This was due to the fact that the well-known stable reducing agents would not absorb oxygen of the air at a rate which would make their use feasible in gas analysis, whereas those reagents such as pyrogallol, which would absorb oxygen from a gas at a sufficient rate of speed, lost their efficiency in an exceedingly short time. By means of this invention the capacity of the oxygen-absorbing solution is enormously increased, and at the same time a stable solution is produced which will maintain its activity for an indefinite period. It is therefore possible, for the first time, to make continuous and automatic oxygen-absorbing devices capable of extended use without the necessity of repeated and frequent renewal of the solution, such as are now used for the continuous and automatic absorption and analysis of other gases.

Such stable and high capacity solutions may be prepared by the use of a stable reducing agent, which in itself is incapable of rapidly absorbing oxygen from the air, in combination with a catalyst. Such catalysts in general are substances which apparently, either in their original composition, or in the composition to which they are reduced by the stable reducing agent, function through the rapid absorption of oxygen to form an oxidized product which is then reduced to the oxygen absorbing form by the stable reducing agent employed. The oxidized product may, in many instances, be the catalyst in its original form. In selecting a stable reducing agent and a catalyst to be used in such combination, the selection must be such that the reducing agent and the catalyst are stable in each other's presence (except as to reduction of the oxidized form of the catalyst by the stable reducing agent), and particularly so in alkaline solution, in which the absorption is commonly carried out. Moreover, neither the oxidized or reduced form of the catalyst, nor the oxidized reducing agent, may injuriously affect the solution, and preferably should not form precipitates. A solution of two such substances will keep almost indefinitely without noticeable impairment of the oxygen-absorbing capacity. The catalysts in general are organic compounds whose oxidized and reduced modifications present a conjugated system, such a system having, for example, $=O$ and/or $=NH$ at the ends, and being in reversible oxidation-reduction equilibrium with another conjugated system having —OH and/or —$NH_2$ at the ends. Obviously the more soluble conjugated systems are preferred.

The stable reducing agent may be chosen from a considerable number of substances, it being only necessary that it be compatible with the catalyst, stable and strong enough to reduce the oxidized form of the catalyst back to an oxygen absorbing form. For example, alkali sulfide compounds, such as sodium, potassium or ammonium sulfides, or polysulfides may be employed. The polysulfides are preferred. A large number of other substances have likewise been found to be satisfactory. Other sulfides, such as antimonous sulfides and antimonic sulfides, alkaline and acid cuprous chloride solutions, cobaltous amine complexes and also organic reducing agents such as glucose and fructose, preferably in combination, but separately if desired, maltose and lactose may be employed. The sugar should have an aldehyde or ketone group to function in the desired manner.

It has heretofore been attempted to use an oxygen-absorbing solution comprising sodium hydrosulfite, $Na_2S_2O_4$, and an organic catalyst such as sodium anthraquinone beta sulfonate. The sodium hydrosulfite is exceedingly unstable, however, and the use of such a solution was impracticable over any length of time.

The present invention is primarily applicable to the rapid and substantially complete absorption of oxygen from gases containing it. However, the invention is likewise applicable to the absorption of free oxygen from solids or liquids in general, and the principle may be applied to the removal of dissolved oxygen from such liquids as gasoline or water where its presence results in deleterious reactions. Such removal may be accomplished by direct admixture of the oxygen absorbing solution, or by displacement with gases freed from oxygen.

The catalyst may likewise be chosen from a wide variety of materials. For example, alpha-naphthoquinone, pyrogallol (1,2,3-tri-hydroxybenzene), beta-chloro-mercuri-anthraquinone, 1-chloro-anthraquinone-2 carboxylic acid, 1-mercapto - anthraquinone - 2 - carboxylic acid, 2-methyl-1-iodo-anthraquinone, Eikonogen, 2-methyl-anthraquinone-1-carboxylic acid, sodium anthraquinone - beta - sulphonate, 1,2,4-tri-hydroxy-anthraquinone, 1-methyl-2-hydroxy-anthraquinone, 1-amino-anthraquinone-2-carboxylic acid, beta-amino-anthraquinone, 1,5-dihydroxy-anthraquinone, anthraquinone-beta-carboxylic acid, indigo, 1,2-dihydroxy-benzene, hydroquinone, amidol, para-amido-phenol, beta hydroxy-anthraquinone, alizarine red S, alizarine blue S, alizarine, alpha-hydroxy-anthraquinone, alpha amino-anthraquinone. The alpha-naphthoquinone pyrogallol and beta-chloro-mercuri-anthraquinone are preferred. Certain of these catalysts work comparatively better when warm than when used at room temperature. For example, anthraquinone-beta carboxylic acid and 2-methyl-1-iodo anthraquinone became exceedingly effective when used at a temperature of, say, from 40 to 70° C.

Certain combinations of reducing agents and catalysts tend to give viscous solutions, particularly alkaline solutions, which have a tendency to froth and thereby give somewhat inaccurate results due to gas trapping. The gas trapping may be overcome by altering the viscosity of the solution, or the surface tension, or both. This may be done without materially diluting the solution by the addition of 10% or less, say, 3 to 5% of a non-viscous organic solvent. The solvent, must, of course, be inert with respect to the materials contained in the solution, except that a reducing agent will assist in the reaction may be incorporated. For example, ethyl alcohol, isopropyl alcohol, tertiary amyl alcohol, tertiary butyl alcohol, di-ethyl carbinol, ethyl acetate, isopropyl ether, butanol, capryl alcohol, 2,4,dimethyl pentanol-3 or amyl acetate may be used.

In certain instances the change of the viscosity or surface tension apparently increases the rate of absorption of oxygen.

The oxygen-absorbing solutions may be used in any desired gas analysis apparatus. In the majority of the specific examples hereinafter referred to, a steel-wool filled pipette was used. The number of passes of gas into the pipette and the time required will, of course, vary with the different solutions, and the conditions of operation. The use of the steel wool or a similar material having extensive iron surface apparently frequently has a beneficial effect upon the reaction.

In preparing the solutions, it is preferred to make them directly in the bottles in which they are to be kept thus avoiding absorption of oxygen which would take place during a transfer. The reducing agent is added to the solution of alkali in the bottle, or to the water if alkali is not used. In some instances, it may be necessary to cool the alkali before adding the reducing agent. After the addition of the reducing agent to the alkali solution, it is shaken well until the solution is complete, and then the catalyst is added and the solution shaken again until the catalyst is dissolved.

The following are specific examples of the invention:

(1) A solution was made of 46 grams of $Na_2S.9H_2O$, 6 grams of sodium anthraquinone-beta-sulphonate, 11 grams of sodium hydroxide and 150 cc. of water. The solution was warmed to 60–70° C. and was tested upon a 50 cc. sample of air, in a pipette packed with steel-wool. Complete removal of the oxygen was obtained in four passes of the air into the pipette (of 15 seconds each), or if the air sample was left in the pipette for one minute, complete absorption of the oxygen resulted in one pass. At a temperature of 40–45° C. and at 30–35° C., removal was obtained at the same rate. At room temperature, 22° C., complete removal of oxygen was obtained in about six passes or by continuous contact for two minutes. The solution was tested with pure oxygen at 70° C., and then again tested with air and no frothing occurred. The solution was again tested after ten, eighteen, twenty-five and forty-three days and found to be satisfactory and to operate at the original absorption rate. No evidence of decomposition or deterioration was observed.

(2) A solution was prepared from 46 grams of $Na_2S.9H_2O$, 14 grams KOH, 6 grams of sodium anthraquinone-beta-sulphonate and 150 cc. of water. Pure oxygen was allowed to flow into a flask containing the solution and steel-wool, and it was found that 100 cc. of the solution absorbed 2.4 liters of oxygen, or 24.2 cc. of oxygen for each cc. of the solution.

(3) 92 grams of $Na_2S.9H_2O$, 22 grams NaOH and 12 grams of sodium anthraquinone-beta-sulphonate were dissolved in 150 cc. of water. The solution was permitted to stand in contact with steel-wool at a temperature of 80–90° C. for two months. At the end of this time, the solution was found completely satisfactory, and completely removed oxygen from a sample of air at room temperature in from five to six passes. Sodium polysulfide was likewise used in place of the sodium sulfide and was found to give the same satisfactory results.

(4) A solution of 11 grams of NaOH, 18 grams of $Na_2S_x$ (Eimer & Amend's Fused Technical Polysulphide), 6 grams of sodium anthraquinone-beta-sulphonate in 150 cc. of water was prepared. Complete removal of oxygen was obtained in six passes at room temperature. 13.1 cc. of oxygen was absorbed by the solution in one minute. A solution was found to absorb 22.6 cc. of oxygen per cc. of solution. A similar solution tested in a pipette filled with chromel wire coils required eleven passes to remove the oxygen and frothed slightly.

(5) 21.2 grams of $K_2S$, 15.4 grams of KOH and 6 grams of sodium anthraquinone-beta-sulphonate were dissolved in 150 cc. of water. Oxygen was removed in five to six passes at room temperature. The solution, however, was quite viscous.

(6) A solution was prepared of 21.2 grams of $K_2S$, 3 grams of KOH, 4 grams of sodium anthraquinone-beta-sulphonate and 150 cc. of water. This solution completely removed the oxygen from the sample of air in three to four passes, or completely removed oxygen upon one minute's contact in the pipette.

(7) 18 grams of fused technical $Na_2S_x$, 15.4 grams of KOH and 6 grams of sodium anthraquinone-beta-sulphonate were dissolved in 150 cc. of water. The solution removed oxygen from air in four to five passes, or in one minute of continuous contact. This sodium polysulfide solution was quite viscous as were the others, and tended to froth. This difficulty was completely overcome by the addition of 3–5% of ethyl alcohol. With this addition, the sodium polysulfide-KOH solution removed oxygen completely from an air sample in two to three passes in a bubbler pipette. In a steel-wool pipette, oxygen was completely removed in four passes.

(8) A solution of 18 grams of Na$_2$S$_x$, 15.4 grams of KOH, 6 grams of sodium anthraquinone-beta-sulphonate, and 15 grams of lithium nitrate was prepared in 150 cc. of water. Oxygen was completely removed from a sample of air in four to five passes.

(9) 18 grams of sodium polysulfide, 4 grams of 1-mercapto-anthraquinone-2-carboxylic acid, and 15.4 grams of KOH were dissolved in 150 cc. of water. This solution turned purple and removed oxygen satisfactorily, but the solution tended to froth and trap gas. It was discovered that an addition of 10% by volume of any of the following substances eliminated the frothing and trapping: tertiary butyl alcohol, di-ethyl carbinol, ethyl acetate, normal butanol, amyl acetate, tertiary amyl alcohol, capryl alcohol, 2,4,dimethyl pentanol-3, and isopropyl ether. Pyridine eliminated the froth, but tended to form a precipitate.

(10) 18 grams of Na$_2$S$_x$, 2 grams of 1-mercapto-anthraquinone-2-carboxylic acid, 15.4 grams of KOH and 150 cc. of water were mixed and to the solution 4–5% amyl acetate was added. Oxygen was completely removed from a sample of air in five to six passes or by forty-five seconds continuous contact.

The amount of the 1-mercapto-anthraquinone-2-carboxylic acid was then doubled without changing the other constituents and complete removal of oxygen from air was accomplished in four passes or by fifteen to thirty seconds continuous contact. The solution was then tested by shaking pure oxygen into it. It absorbed oxygen so rapidly as to cause a considerable evolution of heat. The solution apparently acted somewhat more rapidly in a steel-wool filled pipette. After absorbing 15.4 cc. of oxygen per cc. solution, the oxygen absorbing rate was still as high as ever in a steel-wool filled pipette, but was somewhat lower in a pipette filled with small coils of Lucero wire.

(11) A solution of 15.4 grams of KOH, 42.4 grams of K$_2$S, 8.4 grams of pyrogallol and 150 cc. of water competely absorbed the oxygen from a sample of air in two to three passes or in fifteen to thirty seconds of continuous contact.

(12) 15.4 grams of KOH, 36 grams of fused technical sodium polysulfide, 8.4 grams of pyrogallol and 150 cc. of water gave a solution which removed oxygen in two passes or in thirty seconds of continuous contact. This rate of removal continued until 36.5 cc. of oxygen had been absorbed per cc. of solution. From this point the solution gradually required a longer time of contact so that by the time 45 cc. of oxygen had been absorbed per cc., three to four passes were necessary or 45 seconds of continuous contact. The solution showed no deterioration after standing over five weeks in daylight. The capacity is enormously greater than that of pyrogallol solutions alone.

The same results were obtained from a similar solution, but with the alkali omitted.

In order to compare the various catalysts, a standard reducing solution was prepared containing 90 grams of sodium polysulfide, 38.4 grams KOH, and 375 cc. of water. 2.1 grams of the catalyst was added to 80–85 cc. of the above solution in each case, or if the solubility was less than this, sufficient to saturate the solution, and the resulting solution was tested in a steel-wool filled pipette. In each case, the tests referred to 100 cc. samples of air, complete removal of oxygen being indicated by 20.8–21.0 cc. absorption.

The following results were obtained:

(In the following tables, the fourth and sixth columns indicate the number of minutes required for substantially complete absorption of the oxygen.)

| No. | Compound | Room temperature | | At 40-70° C. | |
|---|---|---|---|---|---|
| | | Cc. absorbed on 1st pass | Min. for complete absorption | Cc. absorbed on 1st pass | Min. for complete absorption |
| 1 | Sodium anthraquinone beta sulfonate | 8 | 1 –1¼ | | |
| 2 | 1-mercapto anthraquinone 2-carboxylic acid | 12.5–13 | ¼– ½ | | |
| 3 | 1-chloro anthraquinone 2-carboxylic acid | 13–15 | ¼– ½ | | |
| 4 | 2-methyl anthraquinone 1-carboxylic acid | 11 | 1 | 17 | ¼ |
| 5 | 1-methyl 2-hydroxy anthraquinone | 1–2 | | 2.5? | |
| 6 | 1,2,4,tri-hydroxy anthraquinone (purpurin) | 6 | ¾–1 | | |
| 7 | 1-amino anthraquinone 2-carboxylic acid | 3.5 | | 6 | 1¼ |
| 8 | Beta amino anthraquinone | 2.5 | | 4.5 | |
| 9 | 1,5,di-hydroxy anthraquinone | 2 | | 4 | |
| 10 | Beta chloro-mercuri anthraquinone | 19 | ⅙– ¼ | | |
| 11 | Anthraquinone beta carboxylic acid | 5–6 | | 15–18 | ¾ |
| 12 | 2-methyl-1-iodo anthraquinone | 10–11 | ¾–1 | 18–19 | ¼– ½ |
| 13 | 1,2,3,trihydroxybenzene (pyrogallol) | 16 | ¼– ½ | | |
| 13a | 1,2,3,trihydroxybenzene (pyrogallol) (a double amount). | 19 | ¼ | | |
| 14 | Indigo (a dye) | 3–3.5 | | 11.5 | 1 |
| 15 | Eikonogen (a photographic developer) | 11–13 | ½– ¾ | | |
| 16 | 1,2,dihydroxy benzene (pyrocatechin) | 6–7 | 1½ | 13 | ½ |
| 17 | Hydroquinone | 3 | | 9.5 | ¾ |
| 18 | Amidol (a photographic developer) | 3–5 | | 12.5 | ¾ |
| 19 | Para-amido phenol | 1.6 | | 4.5 | |
| 20 | Beta hydroxy anthraquinone | 5 | | 7.5 | 1– 1¼ |
| 21 | Alizarine Red S (a dye) | 1 | | 6 | |
| 22 | Alizarine Blue S (a dye) | 1 | | | |
| 23 | Alizarine (1,2,dihydroxy anthraquinone) | 1 | | | |
| 24 | Alpha hydroxy anthraquinone | .4 | | 6 | 1 |
| 25 | Alpha amino anthraquinone | 2 | | 12 | 1 |
| 26 | Alpha naphthoquinone | 19 | ⅙– ¼ | | |

In No. 1, one-half the amount of polysulfide and one and one-half times the amount of catalyst specified was used. Alcohol was added to eliminate gas trapping.

In Nos. 2, 3, 5, 6, 10, 14, 21, 22, 23, 24 and 26, amyl acetate was added to eliminate frothing.

In Nos. 15, 16, 17, 18, 19 and 20, a double amount of catalyst was used.

The following are examples of organic reducing agents of the reducing sugar type combined with pyrogallol or other catalyst.

*Glucose-fructose solutions made from cane sugar, temp. 25° to start (steel wool used in all runs)*

| Run | Formula at start (total vol. 100 cc.) | Mols red. agent | Cc. of oxygen absorbed during constant shaking of solution, time | |
|---|---|---|---|---|
| | | | 3 min. | 5 min. |
| 1 | 23.7 g. glucose<br>23.7 g. fructose<br>10 g. KOH<br>5 g. pyrogallol | 0.26 | | 1100 |
| 2 | 7.9 g. glucose<br>7.9 g. fructose<br>10 g. KOH<br>5 g. pyrogallol | 0.09 | 1200 | 1200 |
| 3 | 23.7 g. glucose<br>23.7 g. fructose<br>10 g. KOH<br>5 g. 1-chloro-anthra-quinone 2-carboxylic acid. | 0.26 | 1100 | 1200 |
| 4 | 23.7 g. glucose<br>23.7 g. fructose<br>10 g. KOH<br>5 g. 1-mercapto-anthraquinone 2-carboxylic acid. | 0.26 | | 1000 cc. |
| 5 | 23.7 g. glucose<br>23.7 g. fructose<br>10 g. KOH<br>5 g. sodium anthraquinone beta sulphonate. | 0.26 | 1100 cc. | 1200 cc. |

*Reducing sugars + pyrogallol catalyst (steel wool used in all runs)*

Formula { Grams sugar shown in table<br>5 g. KOH<br>1 g. pyrogallol<br>100 cc. H₂O }

| Run | Sugar | Grams sugar | Cc. oxygen absorbed during constant shaking of solution, time | | | | Temp., °C. |
|---|---|---|---|---|---|---|---|
| | | | 1 min. | 2 min. | 3 min. | 5 min. | |
| 1 | Glucose | 12.5 | 200 | | 300 | 320 | 25 |
| 2 | do | 12.5 | 550 | 700 | 820 | 980 | 70 |
| 3 | Fructose | 12.5 | 250 | 350 | 450 | 610 | 25 |
| 4 | do | 12.5 | 500 | 700 | 850 | 920 | 70 |
| 5 | Maltose | 25.0 | 350 | | 500 | 600 | 25 |
| 6 | do | 25.0 | 600 | 800 | 900 | 970 | 70 |
| 7 | Lactose | 25.0 | 200 | | 300 | 400 | 25 |
| 8 | do | 25.0 | 400 | 550 | 640 | 730 | 70 |

*Reducing sugars + sodium anthraquinone beta sulphonate as catalyst (steel wool used in all runs)*

Formula { Grams sugar shown in table<br>5 g. KOH<br>1 g. sodium anthraquinone beta sulphonate<br>100 cc. H₂O }

| Run | Sugar | Grams sugar | Cc. oxygen absorbed during constant shaking of solution, time | | | | Temp., °C. |
|---|---|---|---|---|---|---|---|
| | | | 1 min. | 2 min. | 3 min. | 5 min. | |
| 1 | Glucose | 12.5 | 600 | 1,000 | | 1,070 | 70 |
| 2 | Fructose | 12.5 | 750 | 850 | | 900 | 70 |
| 3 | Maltose | 25.0 | 380 | 620 | 700 | 750 | 70 |
| 4 | Lactose | 25.0 | 500 | 650 | 700 | 730 | 70 |

The capacity of the oxygen absorbing solutions may be increased by the addition of crystals of the stable reducing agent. For example, crystals of Na₂S.9H₂O may be incorporated with a saturated solution of the oxygen absorbent. As the sodium sulphide in solution is exhausted, the crystals go into solution. In general, the finer the crystals the more efficient is the result.

Where it is desired to use the absorbent for removal of carbon dioxide as well as oxygen, it is advisable to have a high concentration of alkali. With a high concentration of alkali, as, for example, in a solution containing 38 parts of KOH, 36 parts sodium sulphide, and 8.5 parts of pyrogallol in 150 parts of water, the time of total oxygen absorption is increased from about ¼–½ minute to ¾–1 minute. While this is still rapid enough for practical use, the continued increase in CO₂ content of the solution further diminishes the rate of oxygen absorption.

This tendency may be overcome by the addition of a minor proportion, say, in the last-mentioned solution, 34 parts of phenol, or the equivalent amount of a substance yielding phenolate ions, preferably an alkali phenolate. Such a solution will long continue to absorb CO₂ and oxygen without diminution in the rate of absorption of either.

Eikonogen is a sodium salt of 1-amino-β-naphthol-6 sulphonic acid. Alizarin red S is a sodium salt of the monosulphonic acid of alizarin that has the formula:

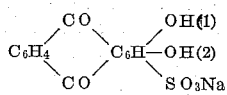

alizarin blue S is a sodium bisulphite compound of alizarin blue and has the formula:

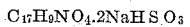

The term "stable", as used herein with reference to oxygen-absorbing solutions of inorganic or organic reducing agents, applies to solutions of reducing agents which do not spontaneously decompose or change so as to materially impair their oxygen absorbing ability on keeping in the absence of air, as distinguished from solutions of materials like sodium hydrosulfite, (Na₂S₂O₄) which do spontaneously decompose in the absence of air.

This application is a continuation in part of my co-pending application, Serial No. 611,928, filed May 17, 1932.

The acceleration noted herein due to the catalytic effect of steel wool occurs not only in the presence of sulfides, but in the presence of other reducing agents, such as sugar. The action appears to be upon the oxygen absorption catalyst, since it occurs with the catalyst alone, such as pyrogallol.

The term alkali metal sulfide as used in the claims hereof includes ammonium sulfides.

The foregoing detailed description has been given for clearness of understanding only, and no unnecessary limitations should be understood therefrom, but the appended claims should be construed as broadly as permissible in view of the prior art.

What I claim as new, and desire to secure by Letters Patent, is:

1. A stable non-frothing oxygen-absorbing solution comprising 18 grams of sodium polysulfide, 2 grams of 1-mercapto-anthraquinone-2-carboxylic acid, 15.4 grams of KOH and 150 cc. of water and 4-5% of amyl acetate.

2. In the process of rapidly and substantially completely removing free oxygen from oxygen-containing gases by means of a stable oxygen-absorbing solution comprising a pyrogallol and an alkali metal sulfide, the step which comprises the process of intimately contacting the solution with said gas in the presence of steel wool.

3. An oxygen absorbing solution having the property of rapidly and completely removing free oxygen from gases containing the same, comprising an alkaline solution of an alkali metal sulfide and an aromatic compound of the class consisting of pyrogallol, alpha-napthoquinone, beta-chloro-mercuri-anthraquinone, 1-chloro-anthraquinone-2-carboxylic acid, and 1-mercapto-anthraquinone-2-carboxylic acid, the sulfide being present in much greater amount than the aromatic compound.

4. A non-frothing oxygen-absorbing solution comprising an alkaline solution of an alkali metal sulfide, an easily oxidizable aromatic compound and a compound of the class consisting of amyl acetate, capryl alcohol, 2,4,dimethyl pentanol, 3, di-ethyl-carbinol, ethyl acetate, tertiary butyl alcohol, isopropyl ether, butanol, and tertiary amyl alcohol.

5. An oxygen and carbon dioxide absorbing solution comprising a strongly alkaline solution of an alkali metal sulfide, pyrogallol, and a minor proportion of phenol.

6. An oxygen absorbing solution comprising a reducing sugar and an oxygen absorption catalyst of the class of easily oxidizable aromatic compounds whose oxidized and reduced modifications present a conjugated system having at least one group of the class consisting of =O and =NH at ends, and in reversible oxidation reduction equilibrium with another conjugated system having at least one group of the class consisting of —OH and —NH$_2$ at ends, and the oxidized form of which is reduced to an oxygen absorbing form by the reducing agent.

7. An oxygen-absorbing solution for the rapid and substantially complete absorption of free oxygen from gases containing the same comprising a concentrated solution of a reducing agent of the class consisting of sulfides, reducing sugars, cobaltous amines, and cuprous chloride, in itself incapable of rapidly absorbing oxygen, and an oxygen absorption catalyst of the class consisting of easily oxidizable aromatic compounds whose oxidized and reduced modifications present a conjugated system having at least one group of the class consisting of =O and =NH at ends, and in reversible oxidation-reduction equilibrium with another conjugated system having at least one group of the class consisting of —OH and —NH$_2$ at ends, and the oxidized form of which is reduced to an oxygen-absorbing form by the reducing agent.

8. An oxygen-absorbing solution for the rapid and substantially complete absorption of free oxygen from gases containing the same, comprising an originally concentrated alkaline solution of a sulfide and an oxygen absorption catalyst of the class consisting of easily oxidizable aromatic compounds whose oxidized and reduced modifications present a conjugated system having at least one group of the class consisting of =O and =NH at ends, and in resersible oxidation-reduction-equilibrium with another conjugated system having at least one group of the class consisting of —OH and —NH$_2$ at ends, and the oxidized form of which is reduced to an oxygen-absorbing form by the reducing agent.

9. A solution as set forth in claim 8, in which the sulfide is an alkali metal sulfide.

10. A solution as set forth in claim 8, in which the sulfide is an alkali metal polysulfide.

11. A solution as set forth in claim 8, in which the reducing agent is present in an amount sufficient to saturate the solution and in which undissolved reducing agent is maintained in connection with said solution.

12. An alkaline oxygen absorbing solution comprising an initially concentrated solution of an alkali metal sulfide together with pyrogallol.

13. A stable non-frothing oxygen-absorbing solution comprising an alkaline oxygen-absorption catalyst of the class consisting of easily oxidizable aromatic compounds whose oxidized and reduced modifications present a conjugated system having at least one group of the class consisting of =O and =NH at ends, and in reversible oxidation-reduction equilibrium with another conjugated system having at least one group of the class consisting of —OH and —NH$_2$ at ends, the oxidized form of which is reduced to an oxygen-absorbing form by the reducing agent and a more powerful reducing agent stable in the absence of oxygen, said reducing agent being capable of reducing the oxidized form of said conjugated system to an oxygen-absorbing form and an inert organic compound of the class consisting of amyl acetate, capryl alcohol, 2,4,dimethyl pentanol-3, di-ethyl-carbinol, ethyl-acetate, tertiary butyl alcohol, isopropyl ether, butanol, and tertiary amyl alcohol.

14. A non-frothing oxygen-absorbing solution comprising an alkaline solution of an alkali metal sulfide, an easily oxidizable aromatic compound of the class consisting of easily oxidizable aromatic compounds whose oxidized and reduced modifications present a conjugated system having at least one group of the class consisting of =O and =NH at ends, and in reversible oxidation-reduction equilibrium with another conjugated system having at least one group of the class consisting of —OH and —NH$_2$ at ends, and a compound of the class consisting of amyl acetate, capryl alcohol, 2,4,dimethyl pentanol, 3,di-ethyl-carbinol, ethyl acetate, tertiary butyl alcohol, isopropyl ether, butanol, and tertiary amyl alcohol.

15. An oxygen and carbon dioxide absorbing solution comprising a strongly alkaline solution of an alkali metal sulfide, an oxygen absorbing catalyst of the class consisting of easily oxidizable aromatic compounds whose oxidized and reduced modifications present a conjugated system having at least one group of the class consisting of =O and =NH at ends, and in reversible oxidation-reduction-equilibrium with another conjugated system having at least one group of the class consisting of —OH and —NH$_2$ at ends, the oxidized form of which is reduced to an oxygen-absorbing form by the sulfide, and a minor proportion of phenol.

16. In the process of rapidly and substantially completely removing free oxygen from oxygen containing gases by means of a stable alkaline oxygen absorbing solution comprising an alkali metal sulfide and an organic oxygen absorption catalyst of the class consisting of easily oxidizable aromatic compounds whose oxidized and reduced modifications present a conjugated system having at least one group of the class consisting of =O and =NH at ends, and in reversible oxidation-reduction-equilibrium with a conjugated system having at least one group of the class consisting of =OH and =NH$_2$ at ends, the oxidized form of which is reduced to an oxygen absorbing form by the alkali metal sulfide, the process which comprises intimately contacting the solution with said gas in the presence of steel wool.

17. An oxygen-absorbing solution for the rapid and substantially complete absorption over extended periods of free oxygen from materials containing the same comprising an originally concentrated solution of an alkali metal sulfide, and an oxygen-absorption catalyst of the class consisting of easily oxidizable aromatic compounds whose oxidized and reduced modifications present a conjugated system having at least one group of the class consisting of =O and =NH at ends, and in reversible oxidation-reduction equilibrium with another conjugated system having at least one group of the class consisting of —OH and —NH₂ at ends, and the oxidized form of which is reduced to an oxygen-absorbing form by the stable reducing agent.

18. The method of removing free oxygen from materials containing the same, which comprises contacting the materials with an oxygen absorption catalyst of the class consisting of easily oxidizable aromatic compounds whose oxidized and reduced modifications present a conjugated system having at least one group of the class consisting of =O and =NH at ends, and in reversible oxidation-reduction equilibrium with another conjugated system having at least one group of the class consisting of —OH and —NH₂ at ends, the oxidized form of which is reduced to an oxygen-absorbing form by the reducing agent, and removing oxygen rapidly and substantially completely from said material, whereby the catalyst is at least in part oxidized to its oxidized form, and continuously treating the oxidized catalyst with a reducing agent comprising an alkali metal sulfide, whereby the catalyst is continuously reverted to a reduced oxygen-absorbing form.

DOROTHY QUIGGLE.